INVENTORS
M. E. REINECKE
B. O. AYERS
BY Hudson & Young
ATTORNEYS

United States Patent Office

3,152,470
Patented Oct. 13, 1964

3,152,470
THERMOCHROMATOGRAPHIC APPARATUS
AND METHOD OF ANALYSIS
Marvin E. Reinecke and Buell O. Ayers, Bartlesville, Okla., assignors to Phillips Petroleum Company, a corporation of Delaware
Filed July 1, 1960, Ser. No. 40,419
4 Claims. (Cl. 73—23.1)

This invention relates to an improved method of analyzing fluid streams.

A method of measuring the concentration of constituents of a fluid stream involves the use of a chromatographic analyzer. In chromatography, a sample of the material to be analyzed is introduced into a column containing a selective sorbent or partitioning material. A carrier gas is directed into the column so as to force the sample material therethrough. The selective sorbent, or partitioning material, attempts to hold the constituents of the mixture. This results in the several constituents of the fluid mixture flowing through the column at different rates of speed, depending upon their affinities for the packing material. The column effluent thus consists initially of the carrier gas alone, the individual constituents of the fluid mixture appearing later at spaced time intervals. A conventional method of detecting the presence and concentration of these constituents is to employ a thermal conductivity detector which compares the thermal conductivity of the effluent gas with the thermal conductivity of the carrier gas directed to the column.

Chromatographic analyzers of the type described have proven to be quite useful. However, it is difficult to determine with a high degree of accuracy the exact concentration of a single constituent or the total concentration of several constituents present in a complex mixture.

We have discovered that the use of thermochromatographic columns in chromatography vastly improves the efficiency of the analyzing process when said thermochromatographic columns are employed as hereinafter described.

Accordingly, an object of this invention is to provide an improved method of and apparatus for analyzing a fluid stream for the presence of individual constituents.

Another object of this invention is to provide an improved method of and apparatus for measuring the total concentration of the several constituents of a fluid stream.

Other objects, advantages, and features of our invention will be readily apparent to those skilled in the art from the following description and appended claims.

Figure 1:
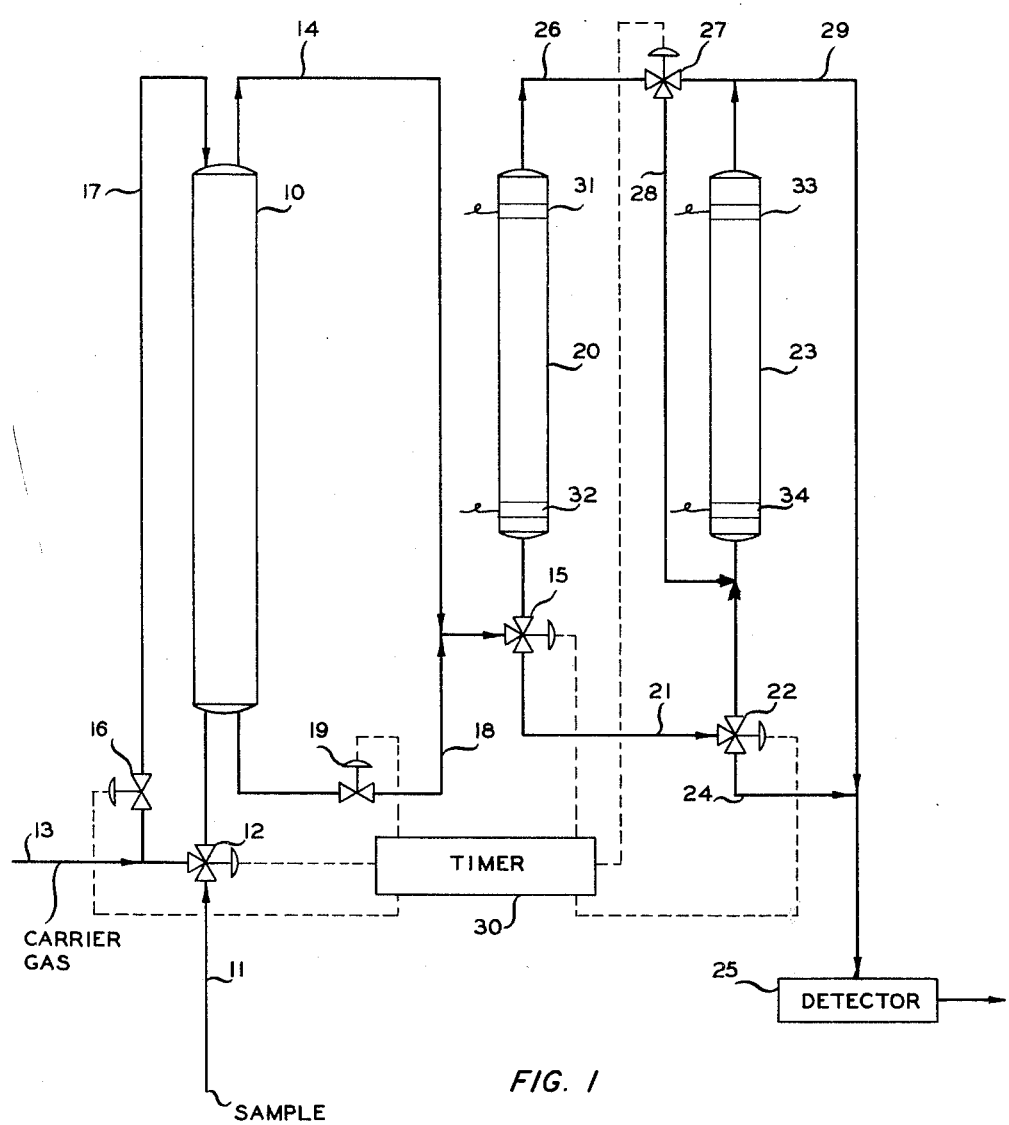

FIGURE 1 is a schematic representation of the analyzing equipment employed in the inventive process.

FIGURES 2a, 2b, 3a, 3b, 4a, and 4b, 5a, 5b and 5c graphical representations of operating features of the analyzer of FIGURE 1.

Referring to FIGURE 1, there is shown a column 10 which is filled with a packing material that selectively retards the passage therethrough of the constituents of a fluid mixture to be analyzed. A fluid sample to be analyzed is introduced into the inlet of column 10 as a vapor by means of a conduit 11 and a three-way control valve 12. Carrier gas in introduced into column 10 by means of a conduit 13 and three-way valve 12. The effluent from column 10 is removed through a conduit 14 which communicates with the inlet of a three-way valve 15.

Carrier gas can also be introduced into column 10 by means of a control valve 16 and a conduit 17, and under these conditions, the effluent is removed from column 10 by means of a conduit 18 and a control valve 19 communicating with the inlet of a three-way control valve 15.

The first outlet of valve 15 communicates with the inlet of column 20. The second outlet of valve 15 is connected by a conduit 21 with the inlet of a three-way valve 22. The first outlet of valve 22 communicates with the inlet of column 23. The second outlet of valve 22 is connected by a conduit 24 to the inlet of a detector 25.

Column 20 is a thermochromatographic column filled with a material which selectively retards the passage therethrough of the constituents of the fluid mixture to be analyzed. Column 20 is provided with a means of heating said column said heating means capable of rapidly raising the temperature uniformly throughout the column so as to emit the constituents of the fluid mixture from column 20 in a smaller volume of carrier gas than that in which they were carried to column 20. A suitable means of heating column 20 is to attach electrodes 31 and 32 as shown and transmit a voltage to said electrodes 31 and 32. Other means of heating column 20 can be employed. The effluent from column 20 is removed through a conduit 26 communicating with the inlet of a three-way control valve 27. The first outlet of valve 27 is connected by means of a conduit 28 with the inlet of column 23. The second outlet of valve 27 communicates with conduit 29.

Column 23 is also a thermochromatographic column filled with a material which selectively retards the passage therethrough of the constituents of the fluid mixture to be analyzed. Column 23 is provided with a means of heating said column, as in the case of column 20, by attaching electrodes 33 and 34 to said column 23 and transmitting a voltage to said electrodes. The effluent from column 23 is removed through a conduit 29 communicating with the inlet of a detector 25.

Detector 25 is adapted to measure a property of the fluid mixture directed thereto, which property is representative of the composition of the fluid mixture. The detector can advantageously comprise a thermal conductivity analyzer which includes a temperature sensitive resistance element disposed in the sample fluid flow. A reference element, not shown, can be disposed in the carrier gas flow. Such a detector provides signals representative of the difference in thermal conductivity between the column effluent and the carrier gas. The temperature differences between the resistance elements can be measured by electrical bridge circuits, such as a Wheatstone bridge. However, the detector can also be any other type of apparatus known in the art for measuring a property of a gaseous stream.

Control valves 12, 15, 16, 19, 22 and 27 are operated by a timer 30. This timer provides output signals that operate the valves in the sequence described hereinafter. This timer can be any type of apparatus known in the art for providing control signals in a desired sequence. One common type of timer which can be employed to advantage utilizes a series of cam operated switches wherein the associated cams are rotated by a timing motor.

The concentrations of constituents present in a fluid sample as determined by a chromatographic analyzer are recorded as peaks. By measuring the area beneath a peak it becomes possible to determine the exact concentration of the constituent in the sample fluid. By employing the inventive process the exact concentrations of the constituents are readily determined by reshaping broad peaks into narrow peaks, improving peak resolution, summing peaks, and storing peaks. The value of storing peaks can be illustrated, for example, in the case of complex mixtures when it becomes desirous to know the total concentration of olefins present. All of the olefin peaks may be stored and recorded as a single peak. Other advantages and features of the inventive process are more readily apparent when reference is made to the following specific analyses of hydrocarbon mixtures.

Column 10 was formed of 10 feet of ⅛ inch stainless steel tubing containing crushed firebrick coated with bis[2-(2 - methoxyethoxy)ethyl]ether. Column 20 was formed of 6 inches of 3/16 inch stainless steel tubing containing silica gel. Column 23 was not used during this run. Helium was employed as the carrier gas and was supplied by conduit 13 at the rate of 37 cc./min. The volume of the sample mixture analyzed was 0.5 cc.

Figure 2A:
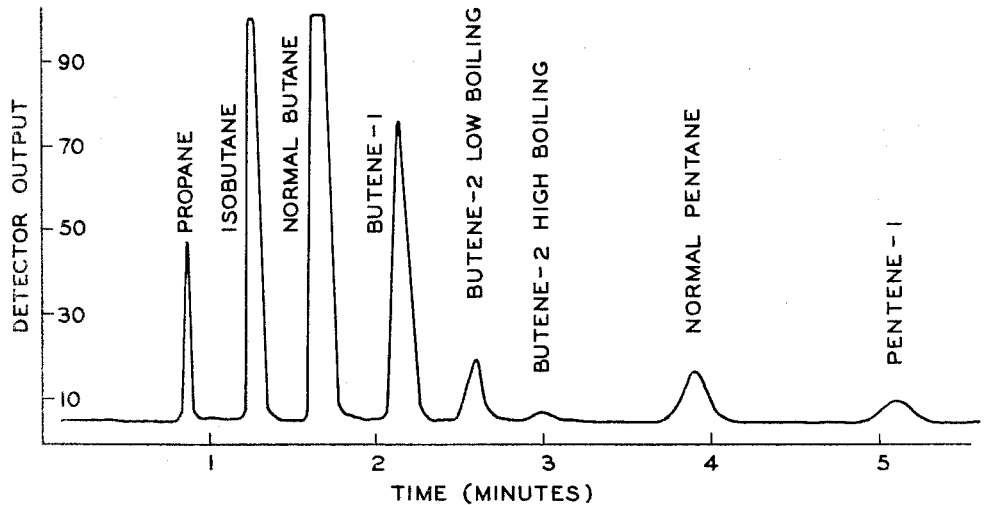
Figure 2B:
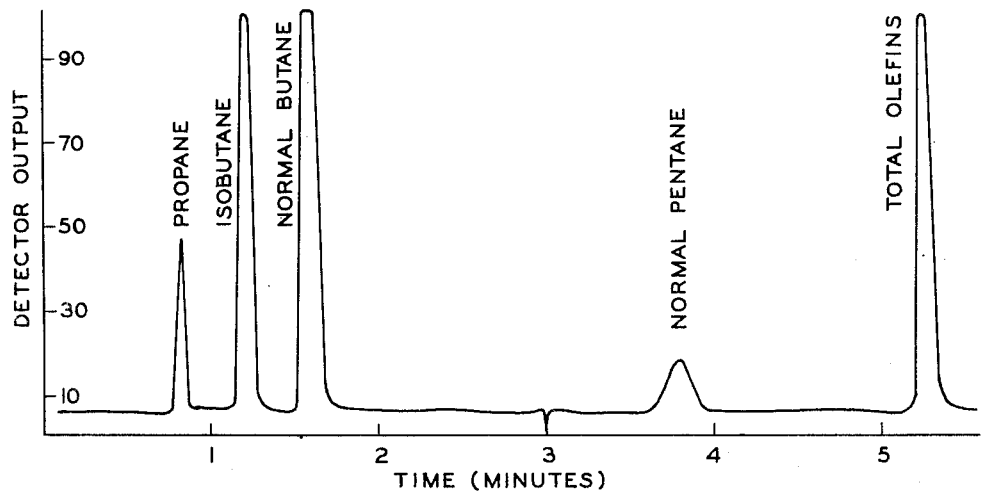

FIGURE 2a illustrates the output signal of detector 25 when column 20 was bypassed throughout the sample run, by passing the effluent from column 10 directly to the detector 25 through conduits 14, 21 and 24. FIGURE 2b illustrates the output signal when column 20 was bypassed for one minute and 50 seconds after the sample mixture was introduced into column 10. The thermochromatographic column 20 was then switched into the sample flow stream for one minute and 25 seconds. Column 20 was then switched out and switched in again after onother minute and thirty seconds. A current of 30 amps at 1.9 volts was then transmitted to electrodes 31 and 32 for a period of 8 seconds, raising the column temperature from 80° to 400° F.

It can readily be seen that by moving thermochromatographic column 20 into and out of the sample flow stream, it was possible to total the olefins in the form of a single peak. It is now possible by another thermochromatographic column 23 or a partition type column, to analyze the olefins independent of other constituents present in the original sample mixture.

Figure 3A:
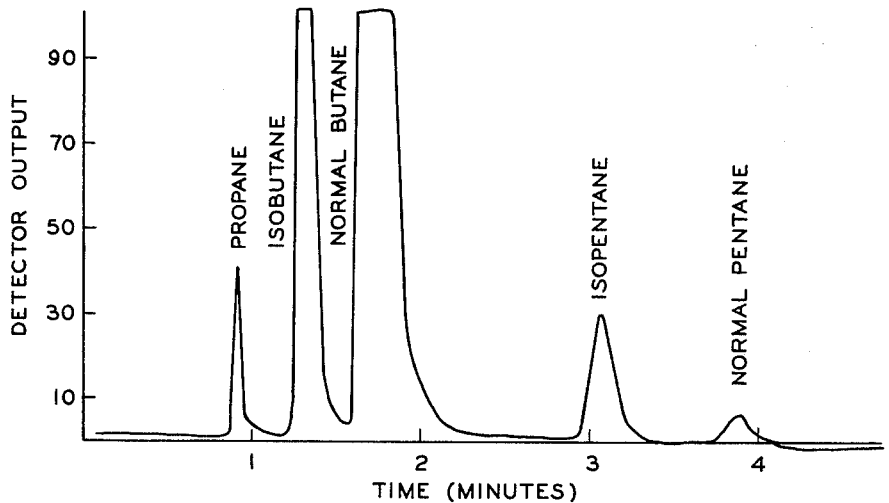
Figure 3B:
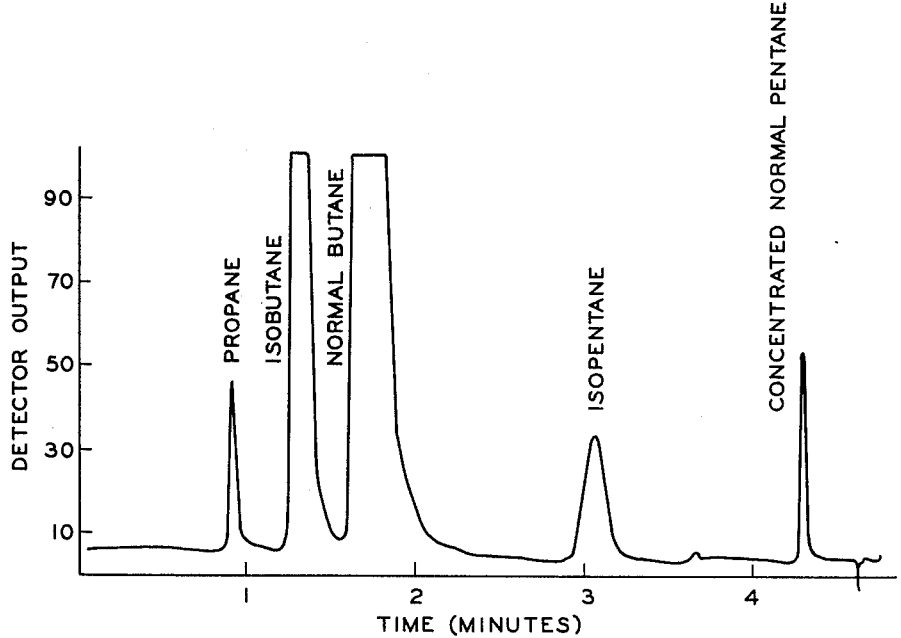

FIGURES 3a and 3b illustrate the result of using columns 10 and 20 for the purpose of concentrating a single peak. For this run, column 10 was formed of 10 feet of ⅛ inch stainless steel tubing containing firebrick coated with bis[2-(2-methoxyethoxy)ethyl]ether. Column 20 was formed of two inches of 3/16 inch stainless steel tubing containing silica gel. Helium was employed as a carrier gas and was supplied by conduit 13 at the rate of 37 cc./min. The volume of the sample mixture analyzed was 0.5 cc. FIGURE 3a represents the output signal of detector 25 when column 20 was bypassed throughout the sample run by thus passing the effluent from column 10 directly to the detector 25 through conduits 14, 21 and 24. FIGURE 3b illustrates the output signal when column 20 was bypassed for three minutes and 37 seconds after admitting the sample to column 10. Column 20 was then cut into the sample flow stream for 38 seconds, then heat was applied to column 20 for four seconds. It is apparent that in concentrating the normal pentane peak the exact concentration of normal pentane in the sample is more readily determined.

Figure 4A:
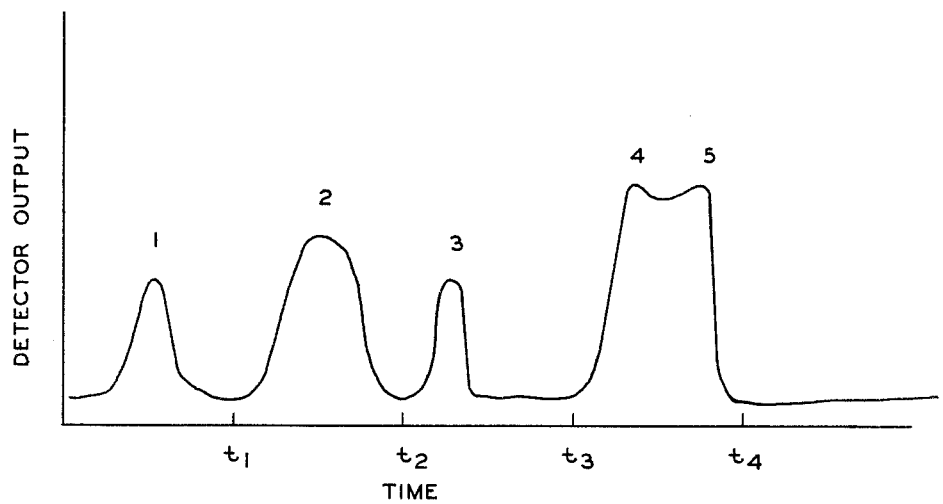
Figure 4B:
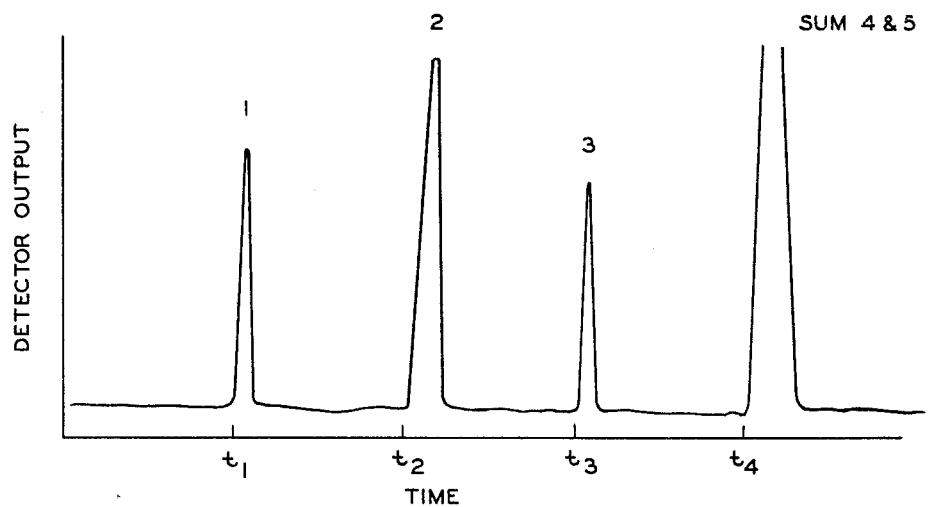

Two thermochromatographic columns connected in series with an elution column, as in FIGURE 1, can be used to improve peak resolution, concentrate peaks, and sum peaks. FIGURE 4a shows a chromatogram of the effluent issuing from column 10. FIGURE 4b illustrates the operation when at time $t_1$ the first eluted peak is in column 20. At this point the programmer causes the valve to switch column 23 into the sample flow stream and to switch column 20 out of the sample flow. Simultaneously, heat is applied to column 20, ejecting the peak as shown in FIGURE 4b. The second peak is concurrently being sorbed on column 23. At time $t_2$ the process is repeated by switching the sample flow from column 23 to column 20 and applying heat to column 23. The cycle is repeated until the sample run is complete.

In studying FIGURE 4b it is noted that the broad peaks of FIGURE 4a have been sharpened. The distance between peaks has been increased and peaks 4 and 5 have been summed into a single peak. This has eliminated the complication of having to make an integration to obtain a summation.

Figure 5A:
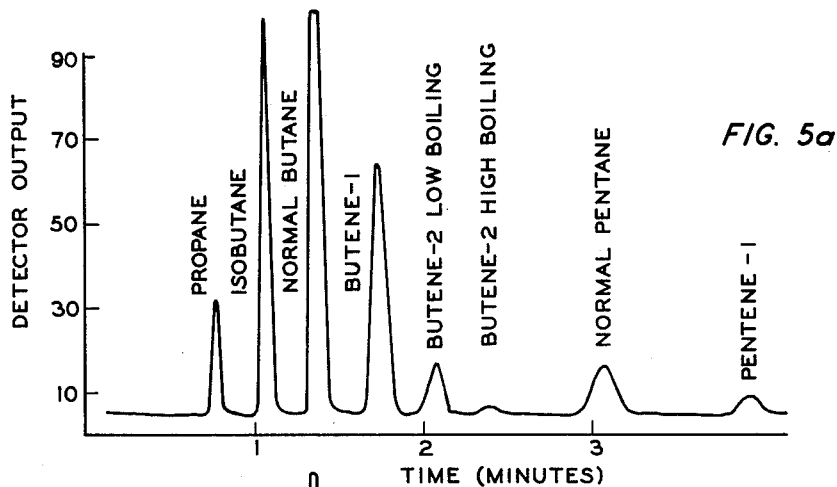
Figure 5B:
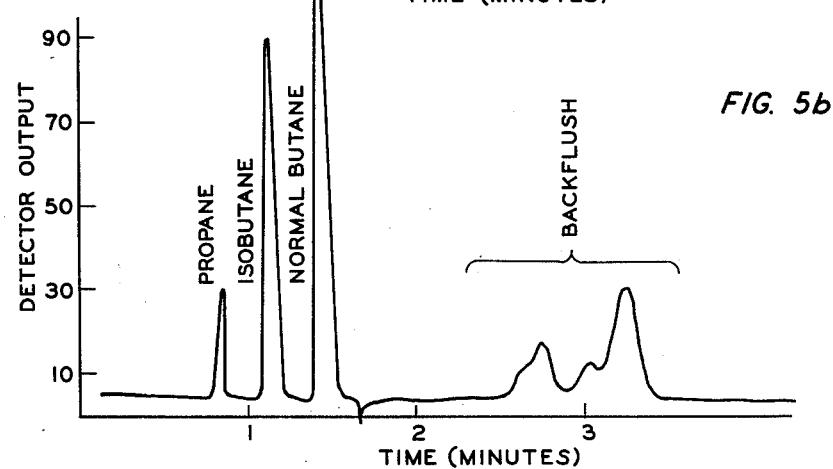
Figure 5C:
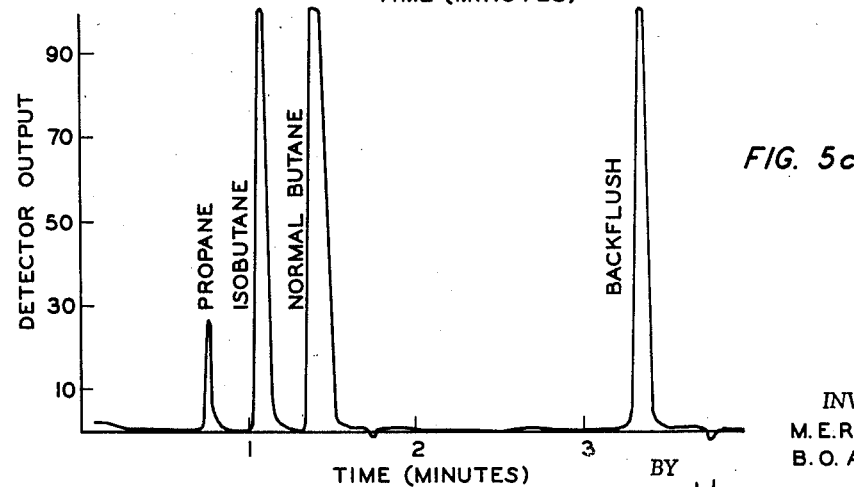

Under specified operating conditions it is desirous to know the total concentration of the heavier components of a fluid mixture. FIGURES 5a, 5b and 5c illustrate the results of employing a back-flush operation of the elution or partition column, followed by passing the back-flushed portion of the sample to a thermochromatographic column, and eluting the combined heavier components as a single peak. FIGURE 5a illustrates the result of passing a fluid sample through column 10 and directly to a detector 25 by means of conduits 14, 21 and 24. FIGURE 5b illustrates the result of passing the same fluid sample through column 10 until the normal butane peak has been eluted from said column. Column 10 was then back flushed with a carrier gas, helium, by means of conduit 17, followed by eluting the back-flushed portion of the sample from column 10 by means of a conduit 18, and passing said eluted portion directly to the detector 25 by means of conduits 18, 21 and 24. FIGURE 5c illustrates the result when the back-flushed sample portion was passed to column 20 and eluted from column 20 as a single peak.

As will be evident to those skilled in the art, various modifications of this invention can be made, or followed, in the light of the foregoing disclosure and discussion without departing from the spirit or scope thereof.

We claim:

1. A method of analyzing fluid mixtures which comprises introducing as a vapor a fluid mixture to be analyzed into the inlet of a first zone which contains a material that selectively retards passage therethrough of the constituents of said mixture, introducing a carrier gas into the inlet of said first zone, passing only a portion of said fluid sample from said first zone as effluent, introducing a carrier gas into said first zone so as to back flush said first zone, passing said back-flushed sample portion to the inlet of a second zone which contains a material that selectively retards passage therethrough of the constituents of said mixture, heating said second zone so as to concentrate said back-flushed portion as a single peak, and measuring a property of the effluent from said first zone and said second zone which is representative of the composition thereof.

2. Apparatus for analyzing fluid mixtures comprising first, second and third columns, each containing a material which selectively retards passage therethrough of the constituents of a fluid mixture to be analyzed; first conduit means communicating with the inlet of said first column to introduce a fluid mixture to be analyzed; second conduit means communicating with the inlet of said first column to introduce a carrier gas; first valve means of controlling fluid flow through said first and second conduit means; third conduit means communicating between the outlet of said first column and the inlet of said second column; fourth conduit means communicating with said third conduit means upstream of said second column and the inlet of said third column; second valve means of controlling fluid flow through said third and fourth conduit means downstream of said communication between said third and fourth conduit means; fifth conduit means communicating between said fourth conduit means upstream of said third column and a means to measure a property of the sample flow stream; third valve means of controlling fluid flow through said fourth and fifth conduit means downstream of said communication between said fourth and fifth conduit means; sixth conduit means communicating between the outlet of said second column and the inlet of said third column; seventh conduit means communicating between said sixth conduit means upstream of said third column and said means to measure a property of the sample flow stream which is representative of the composition thereof; fourth valve means of controlling fluid flow through said sixth and seventh conduit means downstream of said communication between said sixth and seventh conduit means; eighth conduit means communicating between the outlet of said third column and said seventh conduit means; means of rapidly heating said second and third columns.

3. The apparatus of claim 2 to include ninth conduit means communicating with the outlet of said first column; fifth valve means of controlling fluid flow through said ninth conduit means; tenth conduit means communicating between the inlet of said first column and said third conduit means upstream of communication between said third conduit and said fourth conduit means; and sixth valve means of controlling fluid flow through said ninth conduit means.

4. Apparatus for analyzing fluid mixtures comprising first and second columns, each containing a material which selectively retards passage therethrough of the constituents of a fluid mixture to be analyzed; first conduit means communicating with the inlet of said first column to introduce a fluid mixture to be analyzed; second conduit means communicating with the inlet of said first column to introduce a carrier gas; first valve means controlling fluid flow through said first and second conduit means; third conduit means communicating with said first column to introduce a carrier gas so as to back flush said first column; second valve means of controlling the fluid flow through said third conduit means; fourth conduit means communicating between said first column and the inlet of said second column so as to introduce the back flushed sample portion from said first column into said second column; third valve means of controlling fluid flow through said fourth conduit means; means of rapidly heating said second column; and means to measure a property of the effluent from said first column and said second column which is representative of the composition thereof.

References Cited in the file of this patent

UNITED STATES PATENTS

| | | |
|---|---|---|
| 912,994 | Conrad | Feb. 23, 1909 |
| 2,398,818 | Turner | Apr. 23, 1946 |

FOREIGN PATENTS

| | | |
|---|---|---|
| 275,586 | Germany | June 23, 1914 |
| 1,221,186 | France | Jan. 11, 1960 |

OTHER REFERENCES

Analytical Chemistry I, article by D. H. Lightenfels et al., vol. 28, No. 9, September 1956, pages 1376–1379.

Analytical Chemistry II, article by M. C. Simmons et al., vol. 30, No. 1, January 1958, pages 32–35.

Gas Chromatography, by Desty, London Butterworths Scientific Publications, 1958, pages 220–225.

Analytical Chemistry, article by Madison, vol. 30, No. 11, November 1958.